April 3, 1945.  E. N. GATHERCOAL  2,372,821
HARVESTER
Filed Jan. 16, 1943   2 Sheets-Sheet 1
Fig. 1
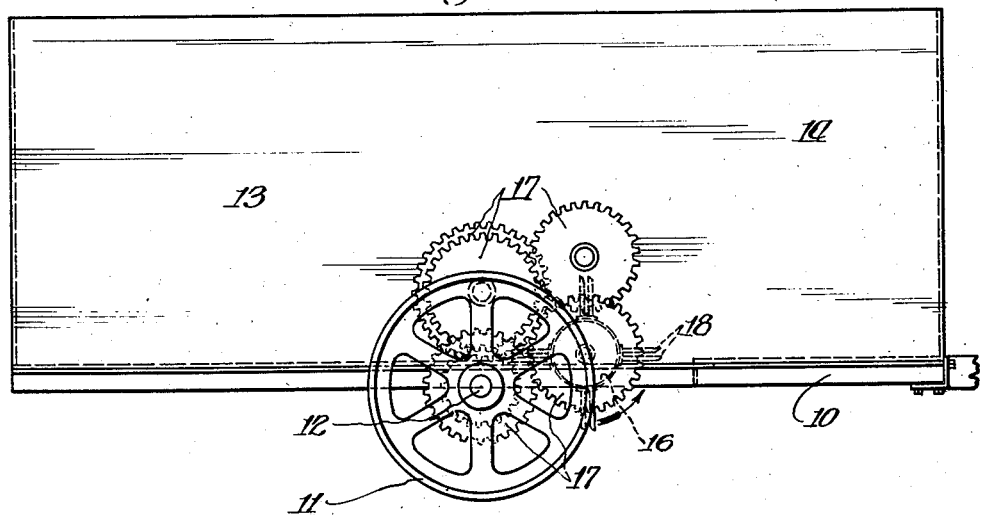
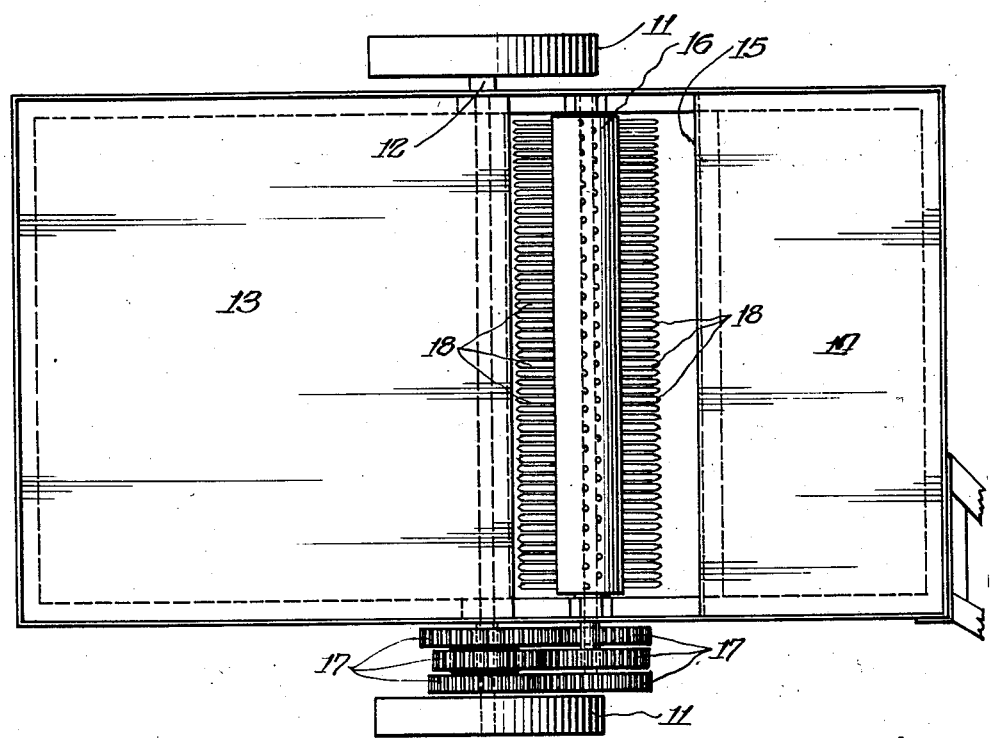
Fig. 2
Inventor:
Edmund N. Gathercoal
By: Brayton Richards
Attorney.

April 3, 1945. E. N. GATHERCOAL 2,372,821
HARVESTER
Filed Jan. 16, 1943 2 Sheets-Sheet 2

Inventor:
Edmund N. Gathercoal
By: Brayton W. Richards
Attorney.

Patented Apr. 3, 1945

2,372,821

UNITED STATES PATENT OFFICE 2,372,821

HARVESTER

Edmund N. Gathercoal, Pentwater, Mich.

Application January 16, 1943, Serial No. 472,553

5 Claims. (Cl. 56—130)

The invention relates to improvements in harvesters, especially adapted for gathering or harvesting flowers, flower heads, fruits or leaves, and has for its primary object the provision of a harvester for the purpose indicated, which is of simple construction and highly efficient in use.

Other objects will appear hereinafter.

The invention consists of the combinations and arrangements of parts hereinafter described and claimed.

The invention will be best understood by reference to the accompanying drawings forming a part hereof and in which—

Figure 3:
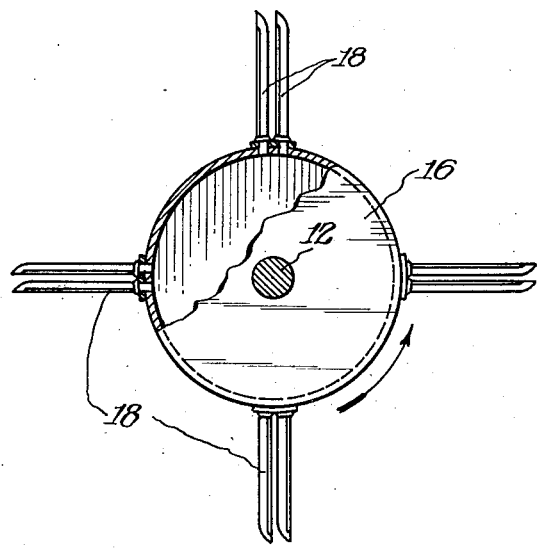
Figure 4:
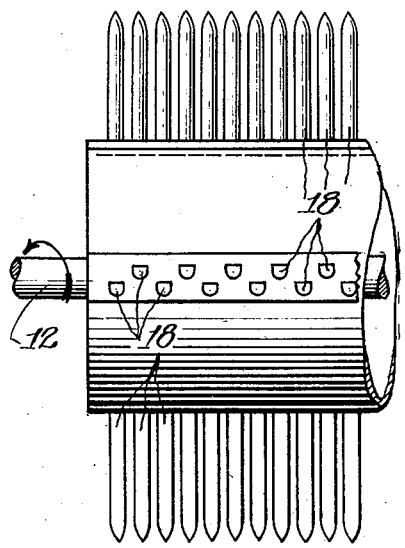
Figure 5:
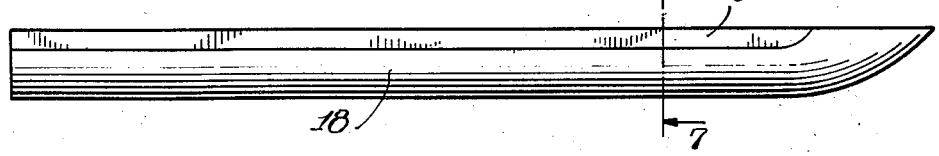
Figure 6:
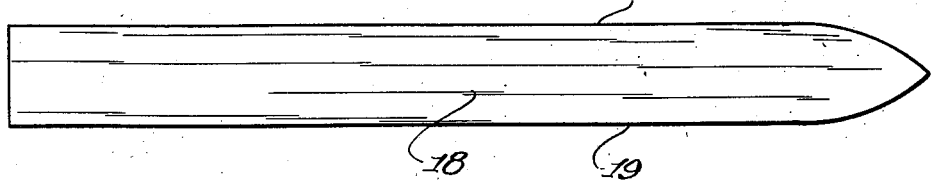

Figure 1 is a partial side view of a harvester embodying the invention;

Fig. 2, a top plan view thereof;

Fig. 3, an end view, shown partially in section, of a harvesting member employed in the construction;

Fig. 4, a partial side view of said harvesting member;

Fig. 5, an enlarged side view of one of a plurality of harvesting teeth or arms employed in the construction;

Fig. 6, a face view of one of said arms, and

Figure 7:
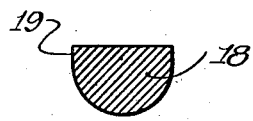

Fig. 7, a transverse section taken substantially on line 7—7 of Fig. 5.

The embodiment of the invention illustrated in the drawings comprises a suitable supporting frame 10 mounted upon wheels 11 secured to a transverse revolving axle 12, and so constructed and arranged that said frame may be readily drawn across a field by tractor, team or other motive power. A rear hopper 13 is provided on the frame 10 and is open at its front and top sides, and a front hopper 14 is also provided on said frame and is open at its rear and top sides. As shown, the hoppers 13 and 14 are spaced apart longitudinally to provide an open space 15 between them, and a revolving harvesting cylinder 16 is mounted as shown in the lower portion of said space. The harvesting member 16 is operatively connected as indicated with the axle 12 of the wheels 11 by means of a train of multiplying gears 17 and whereby the harvesting member 16 will be rotated at high speed in a counter-clockwise direction between and partially below the hoppers 13 and 14. The harvesting member 16 is equipped as shown with a plurality of radiating stripper or harvesting arms 18 which are flat on their forward faces and rounded on their rear faces as shown, said arms being ground along the surfaces 19 at each edge to provide a sharp cutting edge as indicated. The arms 18 are arranged in widely separated longitudinally aligned sets, there being two rows of said arms in each set, and the arms in each row in each set being staggered with relation to those in the other row as shown.

In use, the harvester is drawn through a field of flowers or the like which it is desired to harvest, the particular design illustrated in the drawings being especially adapted for the harvesting of pyrethrum flowers, and the harvesting member 16 is therefore set at a height whereby the flower heads will come to a level just below the axis of the member 16. As the frame is drawn through the field, the flower heads project into the spaces between the sets of the arms 18 so that they will be struck by said forward arms of each set, bent at slight angles to their stems, and snapped from said stems by the action of the rapidly revolving rearward arms 18 of the corresponding set and are then thrown centrifugally into one of the hoppers 13 or 14, from which they may be readily removed as and when desired.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

What I claim is:

1. A harvesting member comprising a revolving body having radiating arms arranged in widely separated longitudinally aligned sets each set of arms comprising two rows and the arms in each row being staggered with relation to those in the other row.

2. The construction specified in claim 1 in which the forward sides of said arms are flat and there being cutting edges at each side of each arm.

3. The construction specified in claim 1 in which each set of arms comprises two rows, and the arms in each row in each set being staggered with relation to those in the other row, the forward sides of said arms being flat and there being cutting edges at each side of each arm.

4. A harvester comprising a wheeled frame; a hopper on the rear portion of said frame closed at its rear, sides and bottom and open at its front; a hopper on the front portion of said frame closed at its front, sides and bottom and open at its rear; a harvesting member rotatably mounted between said hoppers on an axis substantially in the plane of the bottoms of said hoppers and equipped with rotating arms arranged in widely separated longitudinally aligned sets, each set comprising two rows and the arms in each row of each set being staggered with relation to those in the other row and arranged to gather and throw harvested elements in both hoppers; and a driving connection between a wheel of said frame and said harvesting elements.

5. The construction specified in claim 4 in which the forward sides of said arms are flat and there being cutting edges at each side of each arm.

EDMUND N. GATHERCOAL.